(12) United States Patent
Choung et al.

(10) Patent No.: US 8,980,783 B2
(45) Date of Patent: Mar. 17, 2015

(54) CATALYST FOR CONVERTING NITROGEN OXIDE INTO AMMONIA AND METHOD FOR MANUFACTURING THE SAME

(75) Inventors: Jin Woo Choung, Gyeonggi-do (KR); In-Sik Nam, Gyeongbuk (KR); Dal Young Yoon, Gyeonggi-do (KR); Iljeong Heo, Jeju-do (KR)

(73) Assignees: Hyundai Motor Company, Seoul (KR); Postech Academy-Industry Foundation, Pohang, Gyeongsangbuk-do (KR)

(*) Notice: Subject to any disclaimer, the term of this patent is extended or adjusted under 35 U.S.C. 154(b) by 0 days.

(21) Appl. No.: 13/592,582

(22) Filed: Aug. 23, 2012

(65) Prior Publication Data
US 2013/0303364 A1    Nov. 14, 2013

(30) Foreign Application Priority Data
May 9, 2012    (KR) ........................ 10-2012-0049020

(51) Int. Cl.
| | |
|---|---|
| *B01J 21/00* | (2006.01) |
| *B01J 23/56* | (2006.01) |
| *B01J 23/10* | (2006.01) |
| *B01J 27/122* | (2006.01) |

(Continued)

(52) U.S. Cl.
CPC ............ *B01J 37/12* (2013.01); *B01D 53/9418* (2013.01); *B01D 53/945* (2013.01); *B01D 53/9477* (2013.01); *B01D 2255/1025* (2013.01); *B01J 23/42* (2013.01); *B01J 23/44* (2013.01); *B01J 23/462* (2013.01); *B01J 23/63* (2013.01); *B01J 37/0201* (2013.01); *B01J 37/031* (2013.01); *Y02T 10/22* (2013.01)
USPC ............ 502/261; 502/332; 502/304; 502/325

(58) Field of Classification Search
USPC .................................. 502/325, 261, 332, 304
See application file for complete search history.

(56) References Cited

U.S. PATENT DOCUMENTS

| | | | | |
|---|---|---|---|---|
| 5,330,732 | A * | 7/1994 | Ishibashi et al. ........... | 423/213.2 |
| 5,756,057 | A * | 5/1998 | Tsuchitani et al. ........ | 423/213.2 |

(Continued)

FOREIGN PATENT DOCUMENTS

| | | |
|---|---|---|
| KR | 1998-033126 | 7/1998 |
| KR | 1998-071608 | 10/1998 |
| KR | 1999-0077649 | 10/1999 |

OTHER PUBLICATIONS

Heo et al., "Activity and thermal stability of Rh-based catalytic system for an advanced modern TWC", Applied Catalysis B: Environmental, vols. 121-122, pp. 75-87 (2012).

(Continued)

*Primary Examiner* — Colleen Dunn
*Assistant Examiner* — Haytham Soliman
(74) *Attorney, Agent, or Firm* — Mintz Levin Cohn Ferris Glovsky and Popeo, P.C.; Peter F. Corless

(57) ABSTRACT

Disclosed is a catalyst for converting nitrogen oxide into ammonia, which is capable of converting nitrogen oxide into ammonia under fuel lean exhaust gas conditions of more than theoretical air-fuel ratio (A/F=14.7), and a method for manufacturing the same. The catalyst according to the present invention comprises a metal oxide support impregnated with a precious metal, such that conversion of nitrogen oxide into ammonia under fuel lean exhaust gas conditions of more than theoretical air-fuel ratio (A/F=14.7) is possible.

3 Claims, 2 Drawing Sheets

(51) Int. Cl.
  *B01J 23/42* (2006.01)
  *B01J 23/44* (2006.01)
  *B01J 23/46* (2006.01)
  *B01J 23/63* (2006.01)
  *B01J 37/02* (2006.01)
  *B01J 37/03* (2006.01)
  *B01J 37/12* (2006.01)
  *B01D 53/94* (2006.01)

(56) References Cited

U.S. PATENT DOCUMENTS

2001/0051122 A1* 12/2001 Hori et al. .................. 423/213.5
2009/0099014 A1* 4/2009 Miura ........................... 502/304

OTHER PUBLICATIONS

Breen et al., "An investigation of catalysts for the on board synthesis of NH3. A possible route to low temperature NO reduction for lean-burn engines," Catalysis Letters, vol. 7, Nos. 1-4, Apr. 2002.

* cited by examiner

US 8,980,783 B2

CATALYST FOR CONVERTING NITROGEN OXIDE INTO AMMONIA AND METHOD FOR MANUFACTURING THE SAME

CROSS-REFERENCE TO RELATED APPLICATION

This application claims under 35 U.S.C. §119(a) the benefit of Korean Patent Application No. 10-2012-0049020 filed on May 9, 2012, the entire contents of which are incorporated herein by reference.

BACKGROUND (a) Technical Field

The present invention relates to a catalyst for converting nitrogen oxide into ammonia, and a method for manufacturing the same. More specifically, the present invention relates to a catalyst for converting nitrogen oxide into ammonia, which can efficiently produce $NH_3$ even at a fuel lean region (A/F>14.7, $\lambda$ (lambda)>1), and a method for manufacturing the same.

(b) Background Art

Recently, with the rapidly increasing oil prices, there is a growing interest in developing a lean burn engine for improving energy efficiency and reducing $CO_2$ emissions. In general, the exhaust gas of a lean burn engine contains excess oxygen, and carbon, thus, carbon monoxide (CO) and hydrocarbon (HC), in the exhaust gas can be easily removed by a conventional after-treatment method. However, nitrogen oxide ($NO_x$) cannot be easily removed from the exhaust gas. Therefore, a Lean $NO_x$ Trap (LNT) technology and Selective Catalytic Reduction (SCR) technology using urea ($NH_3$) were developed as after-treatment technologies to reduce $NO_x$ produced from the lean burn engine.

The LNT technology is a technology to remove $NO_x$ by trapping using a $NO_x$ trap material-containing $NO_x$ trap catalyst (Lean $NO_x$ Trap (LNT) or $NO_x$ Storage Catalyst (NSC)).

The SCR technology is a method for spraying an aqueous solution, particularly a urea solution, into an exhaust pipe. The sprayed urea solution is pyrolyzed by heat in the exhaust pipe or catalytically cracked by contact with a catalyst, resulting in the conversion of one molecule of urea into two molecules of $NH_3$. Using this technology, $NO_x$ is exhausted as harmless nitrogen and water by reacting $NO_x$ in the exhaust gas with the SCR catalyst using the converted $NH_3$.

While both technologies are effective in removing $NO_x$ in exhaust gas containing excess oxygen, their application to an actual vehicle is problematic. Namely, the SCR technology using urea needs an infrastructure which can supply urea periodically, to provide $NH_3$ as a reducing agent, and further requires extra equipment for storing and inserting urea into the vehicle.

The LNT technology is also limited because it should use an excess amount of a precious metal to activate the catalyst, it requires a complicated engine operation, and it presents difficulties in removing $NO_x$ at higher temperatures (400° C. or more) and lower temperatures (250° C. or less).

Thus, a three-way catalyst (TWC) converter has been broadly used which does not highly modify the existing after-treatment system for a gasoline vehicle. Further, studies have been focused on developing a passive SCR technology, which produces $NH_3$ using the TWC converter and removes $NO_x$ using the produced $NH_3$.

However, to carry out the existing passive SCR technology, the air-fuel (A/F) ratio of exhaust gas is decreased to a fuel rich region (A/F<14.7, $\lambda$ (lambda)<1), which is lower than the theoretical A/F ratio necessary in order to efficiently produce $NH_3$ As such, this existing technology causes further fuel consumption.

Therefore, there is a need for the development of a technology which can efficiently produce $NH_3$ even at a fuel lean region (A/F>14.7, $\lambda$>1).

SUMMARY OF THE DISCLOSURE

Accordingly, it is an object of the present invention to provide a catalyst for converting nitrogen oxide into ammonia, which can convert nitrogen oxides into ammonia under fuel lean exhaust gas condition of more than a theoretical air-fuel ratio (A/F=14.7), particularly by applying a catalyst impregnated with Rhodium (Rh) on a metal oxide support, and a method for manufacturing the same.

In one aspect of the present invention, a catalyst for converting nitrogen oxide into ammonia ($NH_3$) is provided, which includes a metal oxide support impregnated with a precious metal, and which is able to convert nitrogen oxides into $NH_3$ under fuel lean exhaust gas conditions of more than the theoretical air-fuel ratio (A/F=14.7).

According to various embodiments, the precious metal includes rhodium (Rh).

According to various embodiments, the metal oxide support is $\gamma$-$Al_2O_3$, $SiO_2$, $ZrO_2$, $CeO_2$, $C_3Z_1$ ($Ce_{0.75}Zr_{0.25}O_2$) or a mixture thereof.

In another aspect of the present invention, a method is provided for manufacturing a catalyst for converting nitrogen oxide into $NH_3$ comprising: a step of mixing an aqueous precious metal nitrate solution and a metal oxide support to impregnate the metal oxide support with a precious metal; a step of drying the aqueous precious metal nitrate solution to obtain precious metal powder impregnated on the metal oxide support; and a step of heat-treating the precious metal powder impregnated on the metal oxide support.

According to various embodiments, the weight ratio of the precious metal impregnated on the metal oxide support is about 0.01 to 1 wt % based on the weight of the metal oxide support.

According to various embodiments, the the heat-treating step is conducted at a temperature ranging from about 800 to 1200° C.

According to various embodiments, the heat-treating step is conducted under an oxidizing atmosphere.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not !imitative of the present invention, and wherein.

Figure 1:
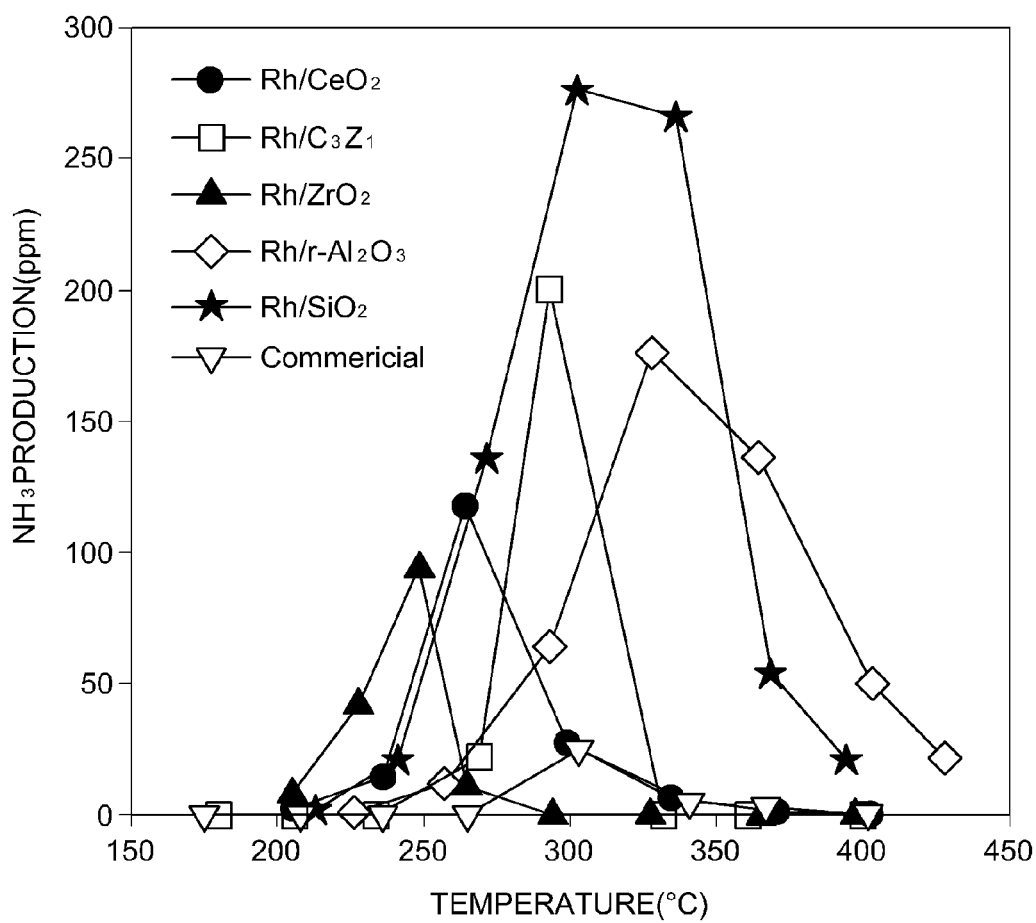
FIG. 1 is a graph showing ammonia ($NH_3$) production during three-way catalyst (TWC) reaction of a rhodium (Rh) catalyst prepared by heat-treating at 1000° C.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter, the preferred embodiments of the present invention will now be described in detail to enable any person skilled in the art to make and use the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

The present invention relates to a method for manufacturing a three-way catalyst (TWC) that produces excess ammonia ($NH_3$) even under fuel lean exhaust gas conditions, particularly under lean fuel exhaust conditions of more than theoretical air-fuel ratio (A/F=14.7), and components thereof.

The present invention further provides a catalyst for $NH_3$ conversion, which can produce excess $NH_3$ even under fuel lean exhaust gas conditions.

According to various embodiments, the catalyst for $NH_3$ conversion is based on a TWC prepared by the impregnation of a precious metal on a metal oxide support. Suitable combinations of a variety of precious metals and metal oxide supports can be used in accordance with the present invention.

According to a preferred embodiment of the present invention, the representative precious metal impregnated on the metal oxide support may be selected from rhodium (Rh), palladium (Pd), platinum (Pt) and the like, and combinations thereof. According to a particularly preferred embodiment, the precious metal is Rh.

According to preferred embodiments, the metal oxide support is selected from $\gamma$-$Al_2O_3$, $SiO_2$, $ZrO_2$, $CeO_2$, $C_3Z_1$ ($Ce_{0.75}Zr_{0.25}O_2$), and mixtures thereof.

In particular, $\gamma$-$Al_2O_3$ is widely used as a support of a vehicle catalyst, and $SiO_2$ is often used as a precursor of a porous support. Further, TWCs for vehicles using $ZrO_2$ can provide improved thermal durability. $CeO_2$ and $C_3Z_1$ ($Ce_{0.75}Zr_{0.25}O_2$) comprising Ce is useful for vehicle catalysts as a co-catalyst for storing oxygen, and recently has been in the spotlight as a precious metal support.

In particular, in the present invention, it is preferred to use $SiO_2$ as a metal oxide support.

According to a preferred embodiment of the present invention, the precious metal impregnated on the metal oxide support is heat-treated at about 800 to 1200° C., and preferably, at about 900 to 1100° C.

The present invention provides a method for manufacturing the catalyst for $NH_3$ conversion, which can produce excess $NH_3$ even under fuel lean exhaust gas condition.

In the first step of the present method, the metal oxide support is mixed with an aqueous precious metal nitrate solution to impregnate the precious metal on the metal oxide support.

Then, the aqueous solution is dried to obtain precious metal powder impregnated on the metal oxide support.

Thereafter, the precious metal powder supported on the metal oxide support is heat-treated at a suitable temperature, such as a temperature of about 800~1200° C.

According to a preferred embodiment of the present invention, the precious metal is Rh, Pd or Pt, and more preferably, Rh.

According to a preferred embodiment of the present invention, the metal oxide support is $\gamma$-$Al_2O_3$, $SiO_2$, $ZrO_2$, $CeO_2$, $C_3Z_1$ ($Ce_{0.75}Zr_{0.25}O_2$), and mixtures thereof.

According to a particularly preferred embodiment, the metal oxide support is $SiO_2$.

According to a preferred embodiment of the present invention, in the first step, weight ratio of the precious metal impregnated on the metal oxide support is 0.01 to 1 wt %, preferably, 0.1 to 0.3 wt %, and most preferably, 0.18 wt %, wherein the wt % is with respect to the weight of the metal oxide support.

In the subsequent heat-treatment step, the heat-treatment may be conducted under oxidizing atmosphere. In particular, the step can include a step of heat-treating under an oxygen-present atmosphere, and reduction to $NH_3$ can be effectively conducted by heat-treating the catalyst under oxidizing conditions, such as by the addition of oxygen.

The heat-treatment step may be conducted at a suitable temperature, such as a temperature ranging from about 800 to 1200° C., and preferably, about 900 to 1100° C.

The Rh catalyst prepared by the present methods may be used as a catalyst system, particularly a catalyst system which can produce excess $NH_3$ from an exhaust gas even at lean condition ($\lambda$ (lambda)>1) with excess oxygen.

Hereinafter, the following Examples are intended to illustrate the present invention without limiting its scope.

Figure 2:
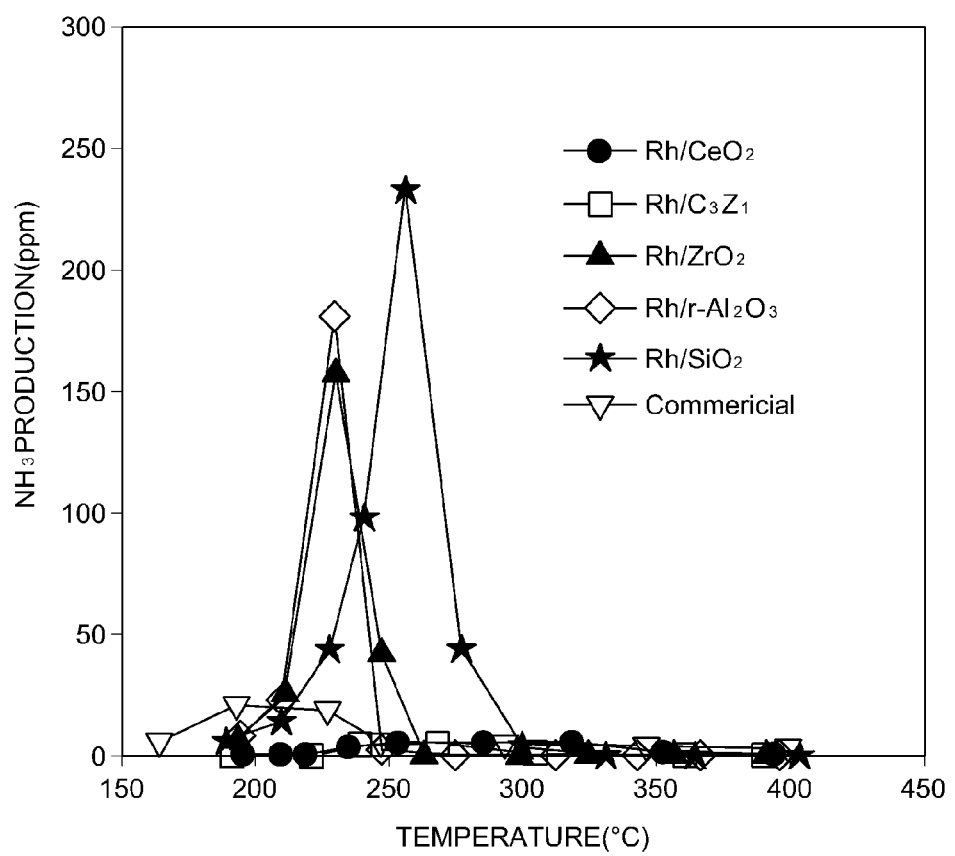
FIG. 2 is a graph showing $NH_3$ production during TWC reaction of an Rh catalyst prepared by heat-treating at 500° C.

The accompanying FIG. 1 is a graph showing $NH_3$ production during TWC reaction of various Rh catalysts prepared by heat-treating at 1000° C., and FIG. 2 is a graph showing $NH_3$ production during TWC reaction of various Rh catalysts prepared by heat-treating at 500° C.

EXAMPLE 1

Rh Catalysts Prepared by Heat-Treating at 1000° C.

1) Preparation of Catalysts 0.18 wt % Rh was impregnated in the following metal oxide supports, $\gamma$-$Al_2O_3$, $SiO_2$, $ZrO_2$, $CeO_2$ and $C_3Z_1$ ($Ce_{0.75}Zr_{0.25}O_2$), respectively, to prepare Rh catalysts.

First, Rh was impregnated on each support, respectively, by mixing a solution comprising distilled water and a calculated amount of Rh nitrate with each support, and a rotary-evaporator was used to remove water from the solution comprising Rh and each support.

The water-removed catalyst powder was dried overnight at 110° C., and heat-treated under an oxidizing atmosphere at 1000° C. for 20 hours.

The $\gamma$-$Al_2O_3$ (Alfa Aesar) and $SiO_2$ (Fuji Silysia Chem.) supports used for impregnating Rh were commercially purchased, and $CeO_2$, $C_3Z_1$ and $ZrO_2$ supports were prepared by a precipitation method. The process for preparing the supports was as follows:

First of all, $Ce(No_3)_3 \cdot 6H_2O$ or $Zr(No_3)_2 \cdot 2H_2O$ was dissolved in distilled water while maintaining the mole ratio of Ce and Zr (i.e. while maintaining the mole ratio of Ce to Zr, Ce:Zr) at 1:0 ($CeO_2$), 3:1 ($C_3Z_1$) and 0:1 ($ZrO_2$), respectively. $NH_4OH$ was added to the homogeneous aqueous solution, and the production of precipitates was checked as pH increased up to 10, after which the solution containing the precipitates was stirred overnight and filtered out to obtain a powder-type catalyst.

The catalyst was dried overnight at 110° C., and finally heat-treated under an oxidizing atmosphere at 700° C. for 5 hours.

Information about the precursor and supports used for preparing the catalysts is listed in Table 1.

TABLE 1

| Compound | Manufacturer |
| --- | --- |
| Rh(III) nitrate solution | Alfa Aesar |
| $Ce(NO_3)_3 \cdot 6H_2O$ | Kanto Chemical Co., INC. |
| $Zr(NO_3)_2 \cdot 2H_2O$ | Kanto Chemical Co., INC. |
| $\gamma$-$Al_2O_3$ | Alfa Aesar |
| $SiO_2$ | Fuji Silysia Chem. |

2) Evaluation of $NH_3$ Production

Performance tests of the catalysts (LOT, Light-off Test) were conducted in a fixed bed continuous flow reactor system, and in order to minimize the effect of diffusion during the test, a 0.5 g sample was prepared as a 20/30 mesh-sized pellet powder.

The prepared catalyst was mixed with 0.7 cc glass beads and equipped to a U-type stainless steel tube reactor, and a molten-salt bath furnace was used to keep an isothermal state during the reaction.

The concentration of the inserted reacting gases was maintained at 1% CO, 500 ppm $C_3H_6$, 1% $O_2$, 500 ppm NO, 0.3% $H_2$, 10% $H_2O$ and 10% $CO_2$, respectively, and Ar gas was used as the balance.

The concentration changes of $H_2$, $O_2$, CO and $C_3H_6$ before and after the reaction were analyzed by GC (HP 6890, Agilent), and the changes of NO, $N_2O$ and $NH_3$ were analyzed by FT-IR (Nicolet 6700, Thermo Electron Co.).

Before the performance tests, all catalysts were pre-treated in a region of $\lambda$=1(A/F=14.7), and the LOT test was conducted in a region of $\lambda$=1.01 (A/F=14.8), wherein $O_2$ was more than the theoretical A/F ratio.

During the LOT test, GHSV (gas hourly space velocity) of the powder reactor was kept to 100,000 $h^{-1}$.

The $NH_3$ production by the prepared Rh catalysts is shown in FIG. 1.

It was demonstrated that $NH_3$ production by all of the Rh catalysts mentioned in Example 1 generally increased by heat-treating under oxidizing atmosphere at 1000° C. for 20 hours regardless of the type of support used.

Among the catalysts, Rh/$SiO_2$ produced the most $NH_3$ (266276 ppm) at around 302~336° C., while Rh/$C_3Z_1$ and Rh/$Al_2O_3$ produced 200 ppm and 176 ppm $NH_3$, respectively, at around 293~328° C.

The greatest $NH_3$ productions by the Rh/$CeO_2$ and Rh/$ZrO_2$ catalysts were less than 150 ppm, which was less than the other Rh catalysts for Example 1 (Rh/$SiO_2$, Rh/$C_3Z_1$ and Rh/$Al_2O_3$).

The commercial TWC, which was heat-treated at the same conditions as in Example 1, showed very little $NH_3$ production of up to 25 ppm at about 300° C.

EXAMPLE 2

Rh Catalysts Prepared by Heat-Treating at 500° C.

1) Preparation of Catalysts

In order to determine $NH_3$ production change of the catalysts based on the temperature of heat-treatment, Rh catalysts were prepared as a powder form by the same method as the preparation of the catalysts in Example 1, except heat-treatment was carried out under an oxidizing atmosphere at 500° C. for 5 hours.

2) Evaluation of $NH_3$ Production

Performance tests of the catalysts prepared in Example 2 were conducted at the same conditions as Example 1.

The amount of $NH_3$ produced the prepared Rh catalysts during the TWC reaction is shown in FIG. 2.

The Rh catalysts of Example 2 demonstrated different $NH_3$ production depending on the type of the support.

As shown in FIG. 2, among the Rh catalysts, the Rh/$SiO_2$ catalyst produced the highest $NH_3$ of 233 ppm at around 256° C., and the Rh/$Al_2O_3$ and Rh/$ZrO_2$ catalysts produced $NH_3$ of 180 ppm and 157 ppm, respectively, at around 230° C.

Rh/$CeO_2$ and Rh/$C_3Z_1$ did not produce $NH_3$ due to low $NO_x$ conversion. The commercial TWC prepared for comparison produced $NH_3$ up to 21 ppm at around 185° C. under the same performance evaluation conditions.

TEST EXAMPLE

Results of Examples 1 and 2 were checked to confirm the $NH_3$ formation behavior of the heat-treated Rh catalysts of the present invention.

As shown in FIGS. 1 and 2, the Rh/$SiO_2$ catalyst showed the highest $NH_3$ production at more than theoretical A/F (A/F=14.8).

In particular, it was confirmed that $NH_3$ production of most of the Rh catalysts prepared by heat-treating under an oxidizing atmosphere at 1000° C. for 20 hours were more improved at a higher temperature region than the catalysts prepared by heat-treating at 500° C.

The $Rh/SiO_2$ catalyst heat-treated at 1000° C., which showed the greatest $NH_3$ production, produced $NH_3$ of 266~276 ppm at a temperature ranging from 303 to 336° C. This suggests that 53~55% of the 500 ppm NO inserted as a reacting gas was converted into $NH_3$ even at more than theoretical A/F ratio ($\lambda$=1).

Further, it was confirmed that other metal oxide supports impregnated with Rh, in addition to the $Rh/SiO_2$ catalyst, provided increased $NH_3$ production by heat-treating at 1000° C.

The catalyst for converting nitrogen oxide into ammonia ($NH_3$) according to the present invention, and a method for manufacturing the same provide numerous advantages, such as the following.

The heat-treated precious metal catalyst of the present invention for converting nitrogen oxide into $NH_3$ can be used as a major component of a three-way catalyst (TWC)-SCR catalyst system for reducing $NO_x$.

Further, the catalyst of the present invention for converting nitrogen oxide into $NH_3$ can be used as a key technology for future vehicle exhaust gas after-treatment systems, and can be useful for lowering pollution and providing eco-friendly vehicles conforming to WTO environmental regulations.

While certain embodiments have been described, these embodiments have been presented by way of example only, and are not intended to limit the scope of the disclosures. Further, it will be apparent to those skilled in the art that modifications and variations not exemplified above can be made in the scope not departing from essential properties. For example, each component shown in detail in the embodiments may be modified and implemented. In addition, it should be understood that difference associated with the modification and application are included in the scope of the present invention defined in the appended claims.

What is claimed is:

1. A catalyst for converting nitrogen oxide into ammonia, which comprises a metal oxide support impregnated with rhodium (Rh), and which converts nitrogen oxides into ammonia under a fuel lean exhaust gas condition of more than theoretical air-fuel ratio, wherein the theoretical air-fuel ratio is 14.7, wherein the catalyst for converting nitrogen oxide into ammonia is manufactured by mixing an aqueous rhodium (Rh) nitrate solution and a metal oxide support to impregnate the metal oxide support with rhodium (Rh) of 0.18 to 1 wt%, wherein the metal oxide support is $SiO_2$; drying the aqueous rhodium (Rh) nitrate solution to obtain a rhodium (Rh) powder impregnated on the metal oxide support; and heat-treating the rhodium (Rh) powder impregnated on the metal oxide support at a temperature ranging from 900 to 1100 ° C; wherein the catalyst converts nitrogen oxides into ammonia under a fuel lean exhaust gas condition of more than theoretical air-fuel ratio.

2. is amended as follows:

A method for manufacturing a catalyst for converting nitrogen oxide into ammonia, which converts nitrogen oxides into ammonia under a fuel lean exhaust gas condition of more than theoretical air-fuel ratio, wherein the theoretical air-fuel ratio is 14.7, comprising:

mixing an aqueous rhodium (Rh) nitrate solution and a metal oxide support to impregnate the metal oxide support with rhodium (Rh) of 0.18 to 1 wt%, wherein the metal oxide support is $SiO_2$;

drying the aqueous rhodium (Rh) nitrate solution to obtain a rhodium (Rh) powder impregnated on the metal oxide support; and heat-treating the rhodium (Rh) powder impregnated on the metal oxide support at a temperature ranging from 900 to 1100 ° C; wherein the catalyst converts nitrogen oxides into ammonia under a fuel lean exhaust gas condition of more than theoretical air-fuel ratio.

3. The method of claim 2, wherein the heat-treating step is conducted under an oxidizing atmosphere.

* * * * *